(12) United States Patent
Hong et al.

(10) Patent No.: US 12,449,924 B2
(45) Date of Patent: Oct. 21, 2025

(54) STRETCHABLE PRESSURE SENSOR ARRAY AND ELECTRONIC DEVICE INCLUDING SAME

(71) Applicant: SEOUL NATIONAL UNIVERSITY R&DB FOUNDATION, Seoul (KR)

(72) Inventors: Yong Taek Hong, Seoul (KR); Han Ul Kim, Seoul (KR); Ji Seok Seo, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 18/272,388

(22) PCT Filed: Mar. 17, 2023

(86) PCT No.: PCT/KR2023/003619
§ 371 (c)(1),
(2) Date: Jul. 14, 2023

(87) PCT Pub. No.: WO2023/182737
PCT Pub. Date: Sep. 28, 2023

(65) Prior Publication Data
US 2024/0385711 A1    Nov. 21, 2024

(30) Foreign Application Priority Data

Mar. 22, 2022 (KR) .......... 10-2022-0035374
Nov. 11, 2022 (KR) .......... 10-2022-0151043

(51) Int. Cl.
| | |
|---|---|
| G06F 3/041 | (2006.01) |
| G01L 1/12 | (2006.01) |
| G01L 1/18 | (2006.01) |
| G01L 1/22 | (2006.01) |

(52) U.S. Cl.
CPC ............ *G06F 3/04144* (2019.05); *G01L 1/12* (2013.01); *G01L 1/18* (2013.01); *G01L 1/2287* (2013.01);
(Continued)

(58) Field of Classification Search
CPC ..... G01L 1/12; G01L 1/18; G01L 1/20; G01L 1/22; G01L 1/2287; G06F 2203/04105;
(Continued)

(56) References Cited

U.S. PATENT DOCUMENTS

2015/0116073 A1* 4/2015 Suzuki ............... H03K 17/9647
29/622
2018/0266898 A1    9/2018 Yoon et al.
(Continued)

FOREIGN PATENT DOCUMENTS

| KR | 10-1172852 B1 | 8/2012 |
|---|---|---|
| KR | 10-1783413 B1 | 9/2017 |

(Continued)

OTHER PUBLICATIONS

International Search Report for PCT/KR2023/003619 dated Jun. 8, 2023 [PCT/ISA/210].

*Primary Examiner* — Robin J Mishler
(74) *Attorney, Agent, or Firm* — Sughrue Mion, PLLC

(57) ABSTRACT

The present invention relates to a stretchable pressure sensor array, comprising: a sensor sheet including an elastic body; a plurality of conductive pillars at least partially embedded in the sensor sheet and formed by aligning magnetic particles in a thickness direction of the sensor sheet; an upper electrode formed on the sensor sheet; and a lower electrode formed under the sensor sheet, wherein when pressure is applied from the upper or lower surface of the sensor sheet
(Continued)

in the thickness direction, a conductive path is formed between the upper and lower electrodes and the conductive pillar so that current flows.

15 Claims, 6 Drawing Sheets

(52) U.S. Cl.
CPC .. *G06F 3/0412* (2013.01); *G06F 2203/04105* (2013.01)

(58) Field of Classification Search
CPC ............... G06F 3/04144; G06F 1/1652; G06F 2203/04102; G06F 3/0414; G06F 3/0412
See application file for complete search history.

(56) References Cited

U.S. PATENT DOCUMENTS

| | | | |
|---|---|---|---|
| 2020/0125215 A1* | 4/2020 | Choi | G06F 3/0443 |
| 2022/0137767 A1* | 5/2022 | Astley | G06F 3/041661 |
| | | | 345/174 |
| 2022/0279646 A1* | 9/2022 | Hong | H05K 1/032 |

FOREIGN PATENT DOCUMENTS

| | | |
|---|---|---|
| KR | 10-1928674 B1 | 12/2018 |
| KR | 10-2019-0020481 A | 3/2019 |

* cited by examiner

STRETCHABLE PRESSURE SENSOR ARRAY AND ELECTRONIC DEVICE INCLUDING SAME

CROSS REFERENCE TO RELATED APPLICATIONS

This application is a National Stage of International Application No. PCT/KR2023/003619 filed Mar. 17, 2023, claiming priority based on Korean Patent Application No. 10-2022-0035374 filed Mar. 22, 2022 and Korean Patent Application No. 10-2022-0151043 filed Nov. 11, 2022, the entire disclosures of which are incorporated herein by reference.

BACKGROUND

1. Field

Examples disclosed in the present invention, relate to a stretchable pressure sensor, and more specifically, relate to a stretchable pressure sensor array capable of implementing high resolution.

In addition, examples disclosed in the present invention also relate to an electronic device comprising a pressure sensor.

2. Description of the Related Art

With development of mobile communication technology, the era of smartphones followed the spread of personal computers, and since then, research on electronic devices having flexible next-generation displays such as wearable devices or stretchable devices, and the like has been gradually processing.

In these displays, an input device is generally driven by a touch method, and such devices are usually equipped with a pressure sensor. Conventional devices had a structure in which a pressure sensor was provided on a rigid substrate, but in the upcoming era of flexible devices, development of a stretchable pressure sensor which is flexible and has high spatial resolution was required.

According to studies up to date, conventional stretchable pressure sensors used to be fabricated by forming an Organic Thin-Film Transistor (OTFT) circuit in a polymer with excellent pressure characteristics to minimize an electrical crosstalk effect.

According to the conventional method, an array is formed by a method of using a polymer whose capacitance changes depending on pressure as an insulating layer, or connecting a polymer whose resistance changes to a source or drain.

However, such a method had problems in that it has a high process cost and a difficult level of difficulty due to a multi-step process, and deterioration in characteristics of an element cannot be avoided because a transistor is located in a part where stretchability is required.

SUMMARY

The present invention relates to a stretchable pressure sensor array, comprising: a sensor sheet including an elastic body; a plurality of conductive pillars at least partially embedded in the sensor sheet and formed by aligning magnetic particles in a thickness direction of the sensor sheet; an upper electrode formed on the sensor sheet; and a lower electrode formed under the sensor sheet, and when pressure is applied from the upper or lower surface of the sensor sheet in a thickness direction, a conductive path is formed between the upper and lower electrodes and the conductive pillar so that current flows.

Technical Problem

The present invention is to provide a pressure sensor array which can further increase spatial resolution of pressure measurement while maintaining flexibility by improving the structure and manufacturing process of the conventional pressure sensor as described above and a manufacturing method thereof.

An object of the examples suggested in the present invention is to provide a pressure sensor array which can be mass-produced as it can be manufactured through a simple process, and is also customized according to characteristics of each device or needs of a user requiring a sensor array.

Technical Solution

As a solution of the aforementioned problems, the stretchable pressure sensor array according to one example of the present invention comprises a sensor sheet having a thickness of a flexible material; a plurality of conductive pillars formed by self-aligning magnetic particles in a thickness direction of the sensor sheet; an upper electrode formed on the portion of the sensor sheet; and a lower electrode formed on the lower portion of the sensor sheet, and when pressure is applied from the upper side or lower side of the sensor sheet in a thickness direction, a conductive path is formed between the upper and lower electrode and the conductive pillars so that current flows.

According to one example, the plurality of conductive pillars may be distributed while forming an irregular arrangement on the entire surface of the sensor sheet.

According to one example, the upper electrode and the lower electrode may be provided in plurality, and each of the upper electrode and the lower electrode may be formed in a structure that crosses each other when viewed from a vertical section of the sensor sheet.

According to one example, the sensor sheet may be formed of a flexible polymer material.

According to one example, the plurality of upper electrodes, the plurality of lower electrodes or both of them may have a pitch interval with an adjacent electrode of 0.1 mm to 5 mm.

According to one example, the magnetic particle may include a ferromagnetic particle or an aggregate thereof.

According to one example, the magnetic particles may comprise a metal particle selected from nickel, cobalt, iron, manganese, alloys thereof, or combinations thereof.

According to one example, the magnetic particles may a ferromagnetic particle or an aggregate thereof comprising a core comprising a first metal and a shell comprising a second metal different from the first metal.

According to one example, the pressure sensor array may comprise a first region and a second region that are separated from each other, and each of the separated regions may have a mean pitch gap of the upper electrode, the lower electrode or both of them formed in each region is different.

According to one example, the elastomer may comprise at least one of elastomers comprising substituted or unsubstituted polyorganosiloxane, or a substituted or unsubstituted butadiene moiety, elastomers comprising a urethane moiety, elastomers comprising an acryl moiety, elastomers comprising an olefin moiety, or combinations thereof.

According to one example, conductive pillars, may further comprise at least one of conductive nanowires, conductive nanotubes, conductive nanorods, conductive nanofibers, or combinations thereof.

According to one example, the pressure sensor array may be, electrically disconnected in a direction vertical to the thickness direction in the sensor sheet.

According to one example, the gap between the plurality of conductive pillars may be tens of nm to hundreds of nm.

According to one example, the upper electrode, the lower electrode or both of them may form a structure in which at least a part is embedded in the sensor sheet.

One form of an electronic device comprising the stretchable pressure sensor array suggested in another example of the present invention, may comprise a cover glass; a display panel on the bottom of the cover glass; and a pressure sensor array on the bottom of the display panel, and the pressure sensor array, may comprise the pressure sensor array according to the example of the present invention.

Another form of an electronic device comprising the stretchable pressure sensor array suggested in other one example of the present invention, may comprise a housing composed to comprise a first plate with an outer surface facing in a first direction, and a second plate with an outer surface facing in a second direction opposite to the first direction; a display exposed through the outer surface of the first plate; a pressure sensor array arranged inside the housing and arranged below the display; a processor located inside the housing and electrically connected to the display and the pressure sensor; and a memory electrically connected to the processor and located inside the housing, and the pressure sensor array, may comprise the pressure sensor array according to one example of the present invention.

Other form of an electronic device comprising the stretchable pressure sensor array suggested in other one example of the present invention, may comprise a display; a pressure sensor array which detects pressure applied to a first region and the pressure applied to a second region of the display with different spatial resolution each other; a memory; and a processor electrically connected to the memory, and the pressure sensor array, may comprise the pressure sensor array according to one example of the present invention.

In an electronic device comprising the stretchable pressure sensor array according to one example of the present invention, the spatial resolution of a pressure sensor may be tens of dpi to hundreds of dpi.

A preparation method of the stretchable pressure sensor array according to other one example of the present invention, may comprise preparing a substrate; forming a lower electrode on the substrate; forming a sensor sheet by disposing a spacer on the substrate on which the stretchable electrode is formed and applying a substance in which a ferromagnetic particle and an elastic polymer are mixed; forming an upper electrode on the sensor sheet formed by applying; and applying a magnetic field to the sensor sheet by providing a magnet on the upper portion of the upper electrode and the lower portion of the lower electrode.

A preparation method of the stretchable pressure sensor array according to other one example of the present invention, may comprise preparing a substrate; forming a sensor sheet by disposing a spacer on the substrate and applying a substance in which a ferromagnetic particle and an elastic polymer are mixed; applying a magnetic field to the sensor sheet by providing a magnet on the upper portion and lower portion of the sensor sheet; and forming an upper electrode and a lower electrode on the upper portion and lower portion of the sensor sheet.

According to one example of the present invention, at least one of forming an upper electrode and a lower electrode, may form an electrode to comprise a first region and a second region formed to have different pitch intervals from adjacent electrodes each other.

Advantageous Effects

The pressure sensor array fabricated according to the example of the present invention can be prepared through a simple process, and has characteristics suitable for a roll-to-roll process in which a magnetic field and a heat control device are added, and thus there is an advantage in terms of mass productivity.

In addition, since an array can be fabricated by forming an electrode on a large-area film composed of a mixture of a magnetic particle and an elastomer, when an electrode forming method capable of arbitrarily adjusting an electrode pattern such as a solution process is used, a sensor array can be customized and fabricated according to each individual. Therefore, it can not only be used as a user interface in a stretchable display, but also be used as an input device of a wearable device for healthcare.

In the present invention, through a method of aligning conductive particles of a sensing film located between electrodes in a thickness direction, an effect of adjacent pixels is minimized and spatial resolution is improved. In case of a film in which particles are aligned, the electrical conductivity is higher and the percolation threshold is significantly lower than a form in which they are randomly arranged without alignment, so it is possible to form a sensor with a relatively low particle concentration to increase stretchability and increase the operating range to detect all of the pressure range of daily life. In addition, due to structural characteristics in which the shape of the sensor array is determined by upper and lower electrodes, when used as a healthcare device, the sensor array can be customized to suit a user by varying an interval of the electrodes and attaching them. As it has a simple processing process and the only factor limiting the size of the sensor is the size of the area receiving a magnetic field, it can be applied to a normal roll-to-roll process and the like, so there is an advantage in terms of large scale and cost.

MODE FOR INVENTION

Figure 1:
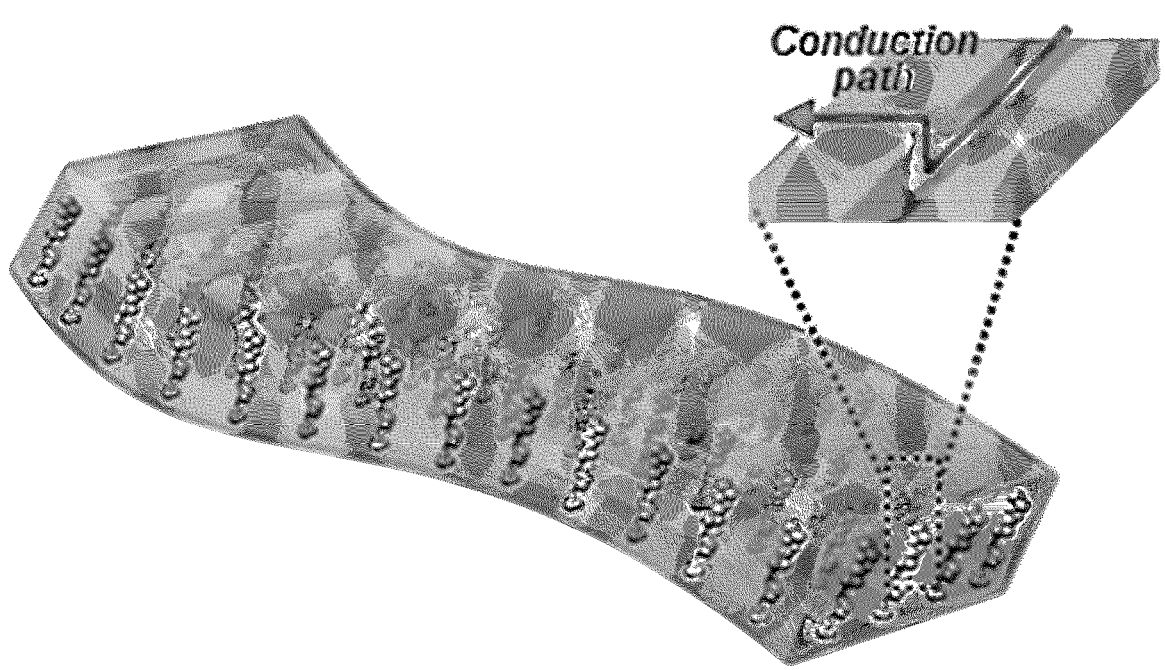
FIG. 1 is, a schematic diagram showing a schematic structure of the pressure sensor array according to one example of the present invention.

Examples of the present disclosure are illustrated for the purpose of describing the technical spirit of the present disclosure. The scope according to the present disclosure are not limited to examples presented below or specific description of these examples.

All technical terms and scientific terms used in the present disclosure have meanings commonly understood by those skilled in the art to which the present disclosure belongs, unless otherwise defined. All terms used in the present disclosure are selected for the purpose of more clearly describing the present disclosure, and are not selected to limit the scope according to the present disclosure.

Expressions such as "comprising", "providing", "having" and the like used in the present disclosure, should be understood in open-ended terms encompassing the possibility of including other examples, unless otherwise stated in a phrase or sentence in which the corresponding expression is included.

Expressions in a singular form described in the present disclosure may include a meaning of a plural form unless otherwise stated, and this is equally applied to expressions in a singular form described in claims. However, even if description of the elements is omitted, it is not intended that such elements are not included in any example.

The present invention relates to a high-resolution pressure sensor array applicable to a stretchable display.

A fabrication method of a pressure sensor array presented in the example of the present invention and a pressure sensor prepared using the same and an array comprising thereof, and an electronic device comprising the pressure sensor array are suggested.

In case of many conventional stretchable pressure sensor arrays, they have been fabricated by a method of combining with an Organic Thin-Film Transistor (OTFT) circuit to minimize an influence of adjacent pixels. However, the corresponding method had high process cost and difficulty due to a multi-step process, and degradation of characteristics of a device cannot be avoided due to a problem of location of a transistor in a part requiring stretchability.

The present inventors could fabricate a piezoresistive sensor sheet with improved spatial resolution and stretchability while reducing an influence of adjacent pixels through self-alignment of magnetic particles. In the present invention, the spatial resolution may be used as the same meaning as spatial resolving power. A high-resolution pressure sensor array was fabricated by forming stretchable electrodes with a desired pattern on the upper and lower portions using such a sensor sheet, and it was confirmed that this sensor array has a great advantage in terms of cost and has an advantage of forming an electronic device by arbitrarily controlling the resolution of the array according to the intention.

The stretchable pressure sensor array suggested in the present invention can be utilized as an user interface of a wearable or stretchable display through which a person can directly interact with displays in various forms from portable displays to automotive displays. In addition, it can be mounted on a wearable device for health care, and thus, it can be utilized as an input device that is attached to a user's skin to effectively read bio-signals.

Another example of the present invention suggests contents related to a fabrication process of a high-resolution pressure sensor array for a stretchable display, and more specifically, suggests a self-alignment technology that reduces an effect of adjacent pixels and increases stretchability, and a technology for forming a stretchable electrode capable of implementing a desired pattern.

FIG. 1, is a schematic diagram showing a schematic structure of the pressure sensor array according to one example of the present invention.

Hereinafter, with reference to FIG. 1 above, the structure of the pressure sensor array according to one example of the present invention will be described in detail.

As a solution of the aforementioned problems, the stretchable pressure sensor array according to one example of the present invention comprises a sensor sheet having a thickness of a flexible material; a plurality of conductive pillars formed by self-aligning magnetic particles in a thickness direction of the sensor sheet; an upper electrode formed on the portion of the sensor sheet; and a lower electrode formed on the lower portion of the sensor sheet, and when pressure is applied from the upper side or lower side of the sensor sheet in a thickness direction, a conductive path is formed between the upper and lower electrode and the conductive pillars so that current flows.

In the sensor sheet, the conductive pillars formed by aggregation of magnetic particles aligned in a thickness direction of the sensor sheet are positioned between the upper and lower sides of the sensor sheet in a piezoresistive film form.

According to one example, the plurality of conductive pillars may be distributed forming an irregular arrangement on the entire surface of the sensor sheet.

The structure aligned in the same form as the pillars in a thickness direction of the sensor sheet of the magnetic particles is formed by spreading over the entire surface of the sensor, but it may not have a regular gap or regularity of arrangement.

According to one example, the upper electrode and the lower electrode may be provided in plurality, and each of the upper electrode and the lower electrode may be formed in a structure that crosses each other when viewed from a vertical section of the sensor sheet.

A conduction path may be formed at points where the upper and lower electrodes of the sensor sheet cross, and each of these crossing pointes may be a unit pixel of the pressure sensor array. Such a structure is specifically shown in FIG. 1.

According to one example, the sensor sheet may be formed of a flexible polymer material.

In the present invention, the material of the sensor sheet is not particularly limited, but the base material of the sensor sheet may be formed by a polymer exhibiting a flexible characteristic.

According to one example, the plurality of upper electrodes, the plurality of lower electrodes or both of them may have a pitch interval with an adjacent electrode of 0.1 mm to 5 mm.

The spatial resolution of the pressure sensor may increase as the pitch interval with an adjacent electrode in the electrodes becomes minuter. In the present invention, it was confirmed through an experiment that a high-resolution pressure sensor array could be implemented by forming a pitch interval with an adjacent electrode in a 10-1 mm scale unit.

According to one example, the magnetic particle may include a ferromagnetic particle or an aggregate thereof.

The magnetic particle may comprise a ferromagnetic material. The magnetic particle may be formed in a structure embedded in an elastomer. The magnetic particle may be in a form of, for example, a ferromagnetic particle or an aggregate thereof. The magnetic particle may have a mean particle diameter of, for example, several nanometers to several tens of micrometers, and for example, it may have a mean particle diameter of about 3 nm or more to less than 100 μm, about 5 nm to 80 μm or about 10 nm to 50 μm, but not limited thereto.

According to one example, the magnetic particles may comprise a metal particle selected from nickel, cobalt, iron, manganese, alloys thereof, or combinations thereof.

According to one example, the magnetic particles may a ferromagnetic particle or an aggregate thereof comprising a core comprising a first metal and a shell comprising a second metal different from the first metal.

The magnetic particle may be a magnetic particle, for example, in a core-shell form, and for example, it may comprise a core comprising a first metal selected from nickel (Ni), cobalt (Co), iron (Fe), manganese (Mn), alloys thereof or combinations thereof, and a shell comprising a second metal different from the first metal. Then, the second metal may be for example, silver (Ag), gold (Au), copper (Cu), lead (Pd), platinum (Pt) or a combination thereof, but not limited thereto.

According to one example, the pressure sensor array may comprise a first region and a second region that are separated from each other, and each of the separated regions may have a mean pitch gap of the upper electrode, the lower electrode or both of them formed in each region is different.

The pressure sensor array may form divided regions according to a user's needs to form spatial resolution of pressure sensing to different degrees, and this may be implemented by adjusting pitch intervals of electrodes.

According to one example, the elastomer may comprise at least one of elastomers comprising substituted or unsubstituted polyorganosiloxane, or a substituted or unsubstituted butadiene moiety, elastomers comprising a urethane moiety, elastomers comprising an acryl moiety, elastomers comprising an olefin moiety, or combinations thereof.

The elastomer may be formed to comprise a PDMS material as one example, but the material of the elastomer is not limited in the present invention.

According to one example, conductive pillars, may further comprise at least one of conductive nanowires, conductive nanotubes, conductive nanorods, conductive nanofibers, or combinations thereof.

The conductive pillars may further comprise conductive nanostructures. The conductive nanostructures may be substances which can exhibit a resistance change by an external power. For example, the conductive nanostructures may comprise a low-resistance metal.

The conductive nanostructures may be for example, linear conductive nanostructures, and for example, may comprise conductive nanowires, conductive nanotubes, conductive nanorods, conductive nanofibers or combinations thereof.

For example, the conductive nanostructures may be silver (Ag) nanowires, but not limited thereto.

According to one example, the pressure sensor array may be, electrically disconnected in a direction vertical to the thickness direction in the sensor sheet.

The pressure sensor array may conduct electricity in a thickness direction by conductive pillars formed in the thickness direction of the sensor sheet, but may not conduct electricity inside the sheet in any direction in a horizontal direction vertical thereto.

According to one example, the gap between the plurality of conductive pillars may be tens of nm to hundreds of nm.

The plurality of conductive pillars are arranged in the thickness direction by an externally applied magnetic field after being mixed with an elastomer as described later, and the gap between the conductive pillars may not show an aligned structure with a specific gap. Then, the mean gap between the conductive pillars may be different depending on what density the conductive particles are contained in the elastomer, but it may be formed as a gap of tens of nm to hundreds of nm as needed.

According to one example, the upper electrode, the lower electrode or both of them may form a structure in which at least a part is embedded in the sensor sheet.

One form of an electronic device comprising the stretchable pressure sensor array suggested in other one example of the present invention may comprise a cover glass; a display panel on the lower portion of the cover glass; and a pressure sensor array on the lower portion of the display panel, and the pressure sensor array may be a stretchable pressure sensor array according to the example of the present invention.

One form of an electronic device comprising the stretchable pressure sensor array suggested in other one example of the present invention may comprise a housing composed to comprise a first plate with an outer surface facing in a first direction, and a second plate with an outer surface facing in a second direction opposite to the first direction; a display exposed through the outer surface of the first plate; a pressure sensor array arranged inside the housing and arranged below the display; a processor located inside the housing and electrically connected to the display and the pressure sensor; and a memory electrically connected to the processor and located inside the housing, and the pressure sensor array, may comprise the pressure sensor array according to one example of the present invention.

One form of an electronic device comprising the stretchable pressure sensor array suggested in other one example of the present invention may comprise a display; a pressure sensor array which detects pressure applied to a first region and the pressure applied to a second region of the display with different spatial resolutions each other; a memory; and a processor electrically connected to the memory, and the present sensor array may be the pressure sensor array according to one example of the present invention.

The electronic device, may have a characteristic capable of sensing pressure with spatial resolution different each other depending on regions.

An electronic device comprising the stretchable pressure sensor array according to one example of the present invention, may have spatial resolution of a pressure sensor of tens of dpi to hundreds of dpi.

The electronic device, may have a characteristic capable of precisely recognizing pressure even up to hundreds of dpi through experiments and implementing high spatial resolution on a display.

Figure 2:
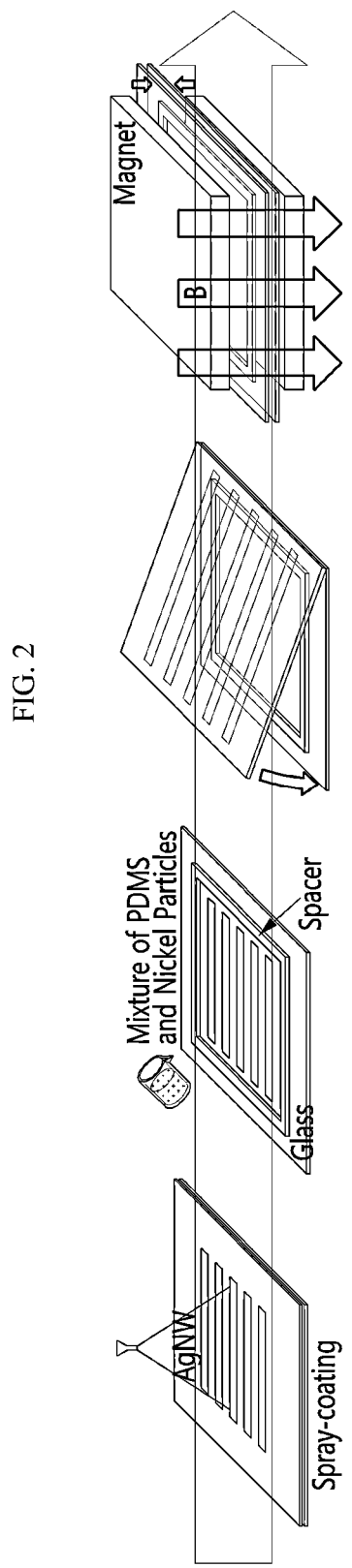
FIG. 2 is, a schematic diagram showing each step of a manufacturing process of the pressure sensor array according to one example of the present invention.

FIG. 2 is, a schematic diagram showing each step of a manufacturing process of the pressure sensor array according to one example of the present invention.

In other example of the present invention, referring to FIG. 2, a preparation method of a stretchable pressure sensor array is specifically described.

At first, a stretchable (lower) electrode is prepared on a substrate. The electrode may be an electrode formed by spray coating, but may be prepared using another method, and in the present invention, a method of forming an electrode is not limited.

In case of the formed electrode, in some cases, a method of performing a solution process directly on the upper portion and lower portion of the sensor sheet or attaching a previously formed electrode sensor.

In other words, in the aforementioned example, a case of forming a lower electrode on a substrate in advance, but it is not matter to proceed the process of forming an electrode by a method of forming a sensor sheet and then forming an electrode on the upper and lower portions of the sensor sheet in the last order.

Then, a sensor sheet may be formed. At that time, a sensor sheet may be formed by a method of placing a spacer on a substrate according to the thickness of the sensor sheet desired to be fabricated and mixing a ferromagnetic particle and an elastomer sufficiently, and then pouring it onto the substrate.

After that, the substrate on which an upper electrode is formed so as to cross the direction of a lower electrode previously formed on the upper portion of the sensor sheet formed as such may be covered so as to have a sandwich structure.

In addition, after applying a magnetic field of sufficient intensity to the lower portion and upper portion of the lower substrate and upper substrate in a vertical direction and aligning them at a room temperature, by thermally curing while applying the magnetic field itself, an elastomer may be cured and at the same time, magnetic particle pillars may be fixed.

A detailed summary of the preparation method of the aforementioned stretchable pressure sensor array is as follows.

The preparation method of the stretchable pressure sensor array according to other one example of the present invention comprises preparing a substrate; forming a lower electrode on the substrate; forming a sensor sheet by disposing a spacer on the substrate on which the stretchable electrode is formed and applying a substance in which a ferromagnetic particle and an elastic polymer are mixed; forming an upper electrode on the sensor sheet formed by applying; and applying a magnetic field to the sensor sheet by providing a magnet on the upper portion of the upper electrode and the lower portion of the lower electrode.

The preparation method of the stretchable pressure sensor array according to other one example of the present invention comprises preparing a substrate; forming a sensor sheet by disposing a spacer on the substrate and applying a substance in which a ferromagnetic particle and an elastic polymer are mixed; applying a magnetic field to the sensor sheet by providing a magnet on the upper portion and lower portion of the sensor sheet; and forming an upper electrode and a lower electrode on the upper portion and lower portion of the sensor sheet.

Figure 3:
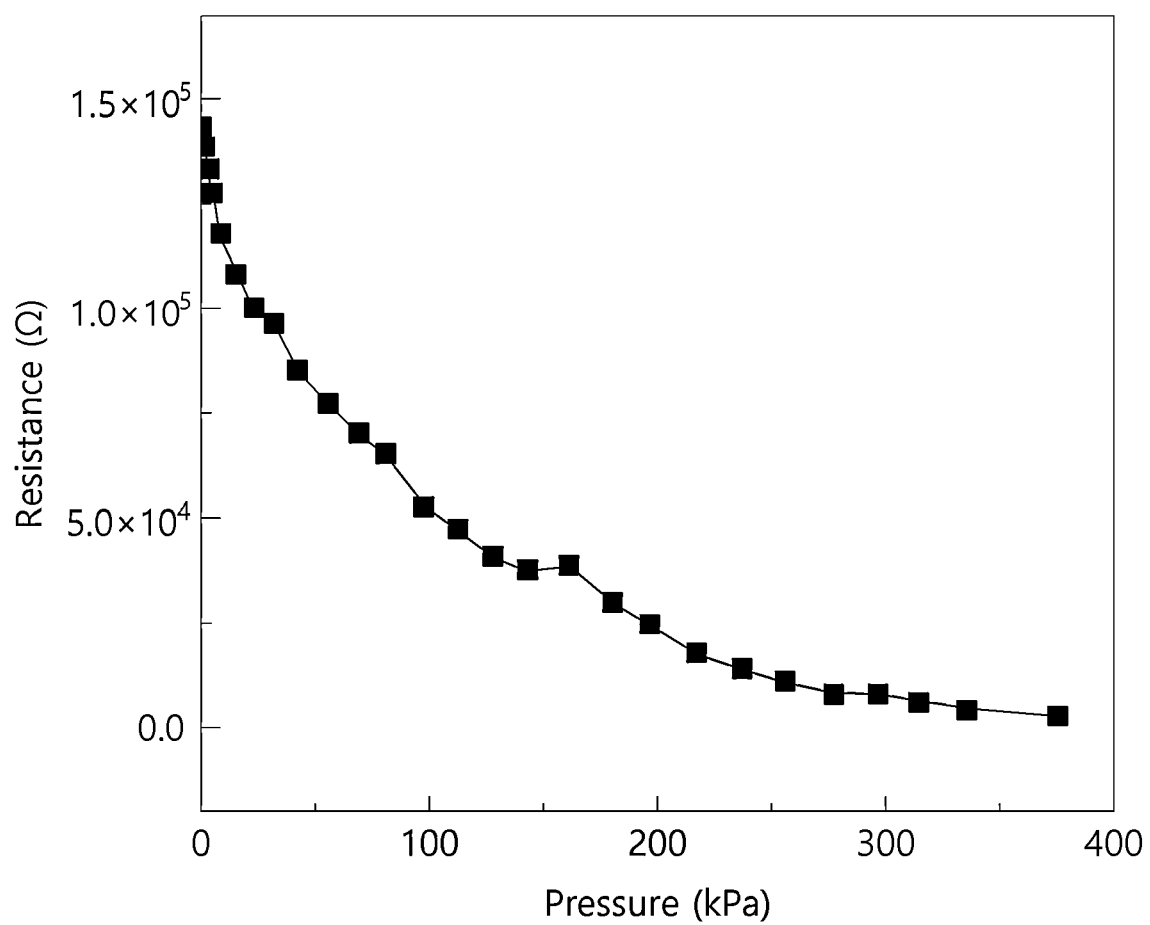
FIG. 3 is, a pressure-resistance characteristic graph shown in the pressure sensor according to one example of the present invention.

FIG. 3 is, a pressure-resistance characteristic graph shown in the pressure sensor according to one example of the present invention.

As shown in FIG. 3, in case of the sensor array formed through this process, most of real-life pressures can be detected with high spatial resolution.

Figure 4:
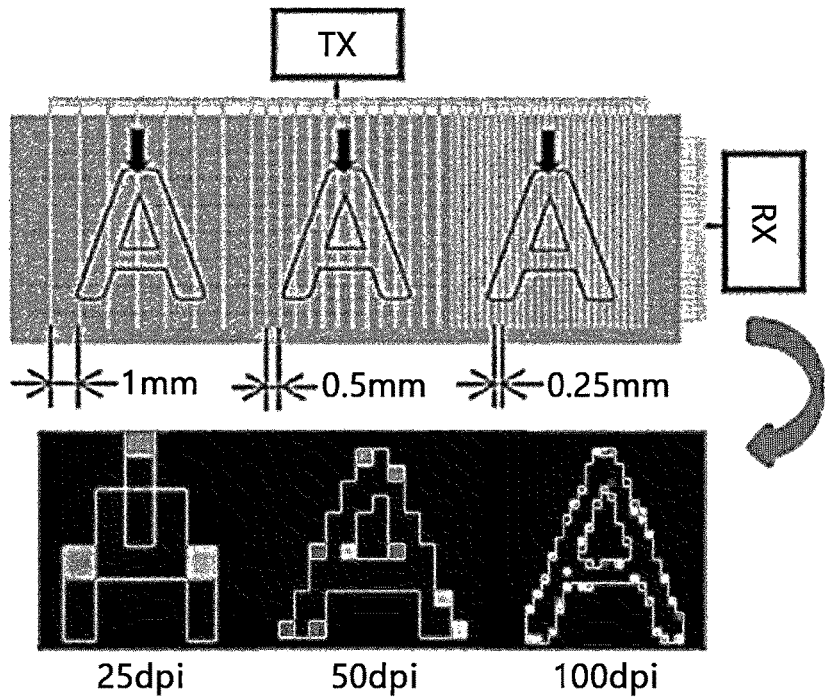
FIG. 4 is, an example image of mapping shown when an array is formed using the pressure sensor according to one example of the present invention.

FIG. 4 is, an example image of mapping shown when an array is formed using the pressure sensor according to one example of the present invention.

The process method is performed in a very simple manner, and when electrodes at various intervals are formed on a single film, a sensor array capable of detecting even the same stimulus at various resolution according to regions can be secured.

In an example fabricated through the actual preparation process, it was fabricated on a scale of 0.25 mm to 1 mm and the spatial resolution was confirmed (See FIG. 4), but this pitch interval may be reduced or enlarged according to the design of the example.

Figure 5:
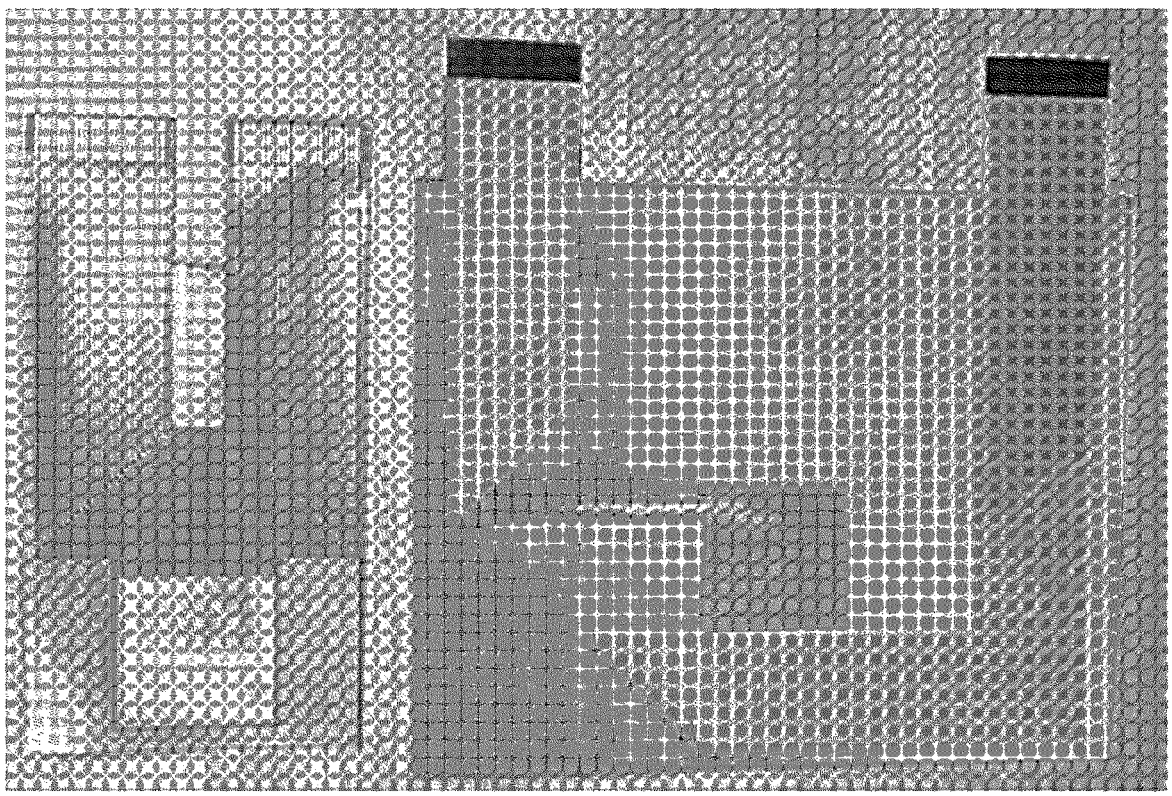
FIG. 5 is, an image showing one form of electrode fabricated when an array is formed using the pressure sensor according to one example of the present invention.

FIG. 5 is, an image showing one form of electrode fabricated when an array is formed using the pressure sensor according to one example of the present invention.

According to one example of the present invention, at least one of the steps of forming an upper electrode and a lower electrode, may form electrodes so as to comprise a first region and a second region formed to have pitch intervals different from an adjacent electrode.

Figure 6:
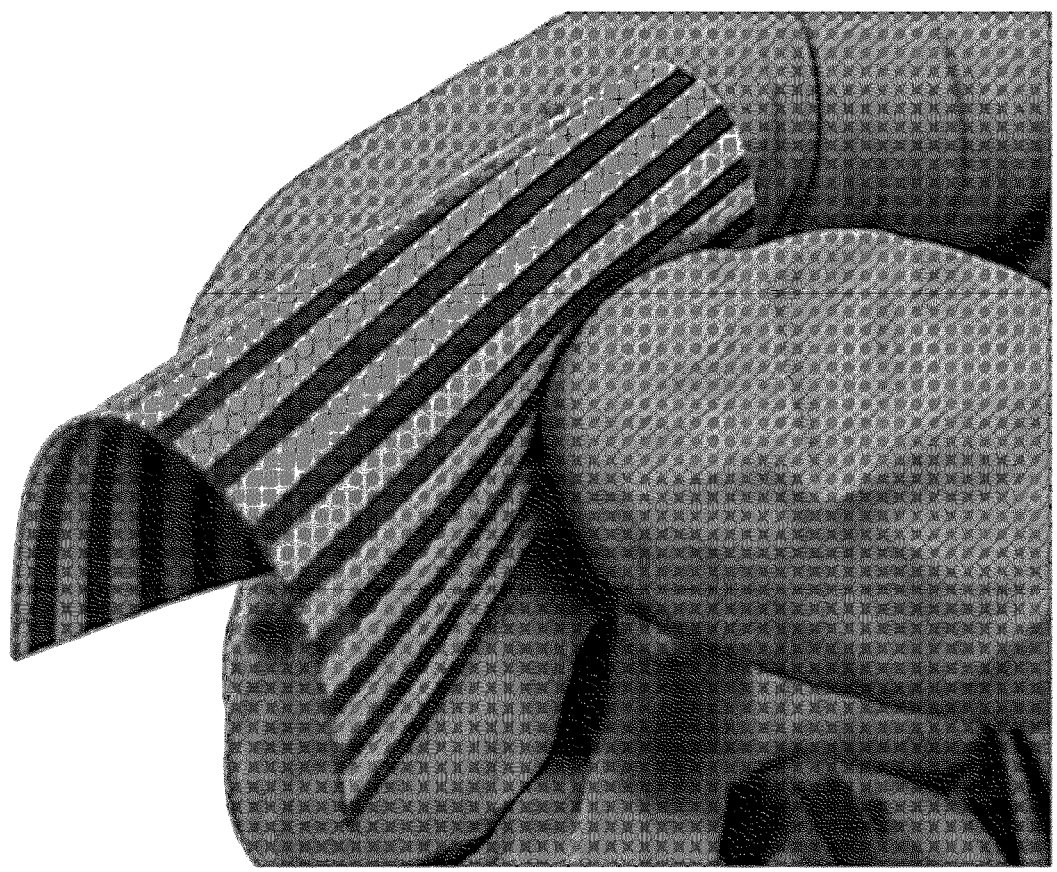
FIG. 6 is, an image folded in half to confirm flexible and stretchable characteristics after fabricating the pressure sensor array according to one example of the present invention.

FIG. 6 is, an image folded in half to confirm flexible and stretchable characteristics after fabricating the pressure sensor array according to one example of the present invention.

In this way, it was confirmed that the pressure sensor array fabricated according to the example of the present invention was bent even if it was folded by hand, and it was confirmed that the spatial resolution of the pressure sensor or characteristics as a sensor did not easily deteriorate even if the bending operation was repeated.

Figure 7:
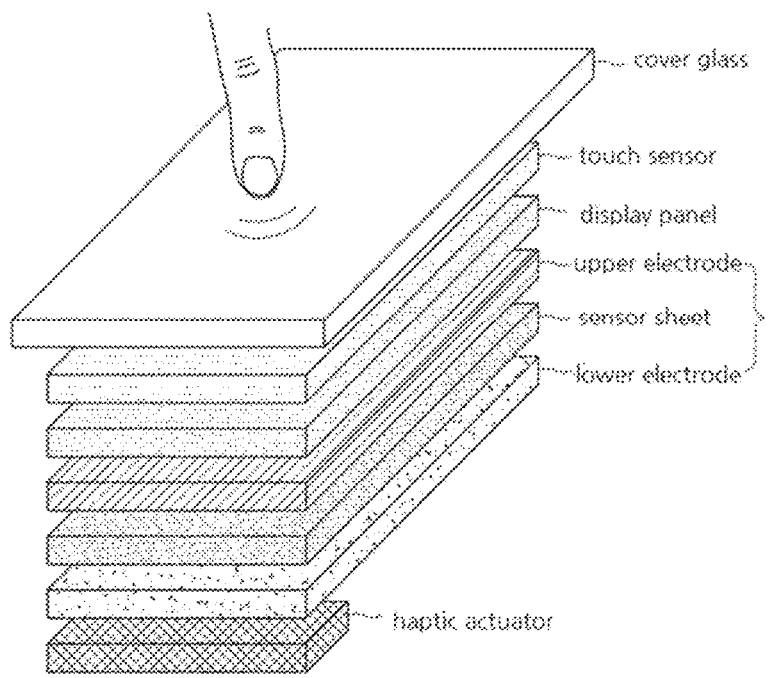
FIG. 7 is, a diagram showing an example of an electronic device to which a pressure sensor array according to an embodiment of the present invention is applied.

FIG. 7 is a drawing showing one example of an electronic device to which the pressure sensor array according to one example of the present invention is applied.

Using the pressure sensor array suggested in the present invention, it is possible to prepare an electronic device in the form as FIG. 7, and the electronic device shown in FIG. 7 is only one form in which the pressure sensor array of the present invention is mounted, and it does not necessarily have to be implemented as an electronic device in this form.

The above description of the present invention is merely intended to illustratively describe the technical spirit of the present invention, and various changes and modifications can be made by those skilled in the art without departing from the essential features of the present invention. Therefore, the examples disclosed herein are not intended to limit the technical spirit of the present invention, but are intended to describe the present invention, and the scope of the technical spirit of the present invention is not limited by these examples. The protection scope of the present invention should be construed by the following claims, and all technical spirits within the equivalent scope thereto should be interpreted as being included in the scope of the present invention.

What is claimed is:

1. A stretchable pressure sensor array, comprising;
   a sensor sheet comprising an elastomer;
   a plurality of conductive pillars at least partially embedded in the sensor sheet and formed by aligning magnetic particles in a thickness direction of the sensor sheet;
   an upper electrode formed on the upper portion of the sensor sheet; and
   a lower electrode formed on the lower portion of the sensor sheet,
   wherein a conductive path is formed between the upper and lower electrodes and the conductive pillars so that current flows when pressure is applied from the upper surface or lower surface of the sensor sheet in a thickness direction,
   wherein the upper electrode and the lower electrode are each provided in plurality, and
   each of the upper electrode and the lower electrode is formed in a structure of crossing each other when viewed based on a vertical section of the sensor sheet, and
   wherein the pressure sensor array senses pressure with varying spatial resolution depending on regions,
   wherein the pressure sensor array comprises a first region and a second region that are separated from each other, and wherein the first region and the second region have different mean pitch gaps between the upper electrodes formed in each region, different mean pitch gaps between the lower electrodes, or different mean pitch gaps of both.

2. The stretchable pressure sensor array according to claim 1,
wherein the plurality of conductive pillars are distributed while forming an irregular arrangement on the entire surface of the sensor sheet.

3. The stretchable pressure sensor array according to claim 1,
wherein the plurality of upper electrodes, the plurality of lower electrodes, or both of them,
have a pitch interval with an adjacent electrode is 0.1 mm to 5 mm.

4. The stretchable pressure sensor array according to claim 1,
wherein the magnetic particles,
comprise a ferromagnetic particle or an aggregate thereof.

5. The stretchable pressure sensor array according to claim 1,
wherein the magnetic particles,
comprise a metal particle selected from nickel, cobalt, iron, manganese, alloys thereof, or combinations thereof.

6. The stretchable pressure sensor array according to claim 1,
wherein the magnetic particles,
comprise a ferromagnetic particle or an aggregate thereof comprising a core comprising a first metal and a shell comprising a second metal different from the first metal.

7. The stretchable pressure sensor array according to claim 1,
wherein the elastomer,
comprises at least one of elastomers comprising substituted or unsubstituted polyorganosiloxane, or a substituted or unsubstituted butadiene moiety, elastomers comprising a urethane moiety, elastomers comprising an acryl moiety, elastomers comprising an olefin moiety, or combinations thereof.

8. The stretchable pressure sensor array according to claim 1,
wherein the conductive pillars,
further comprise at least one of conductive nanowires, conductive nanotubes, conductive nanorods, conductive nanofibers, or combinations thereof.

9. The stretchable pressure sensor array according to claim 1,
wherein the pressure sensor array is, electrically disconnected in a direction vertical to the thickness direction in the sensor sheet.

10. The stretchable pressure sensor array according to claim 1,
wherein the mean gap between the plurality of conductive pillars is tens of nm to hundreds of nm.

11. The stretchable pressure sensor array according to claim 1,
wherein the upper electrode, the lower electrode or both of them form a structure in which at least a part is embedded in the sensor sheet.

12. An electronic device comprising a stretchable pressure sensor array, comprising a cover glass;
a display panel on the bottom of the cover glass; and
a pressure sensor array on the bottom of the display panel,
wherein the pressure sensor array, comprises the pressure sensor array of claim 1.

13. An electronic device comprising a stretchable pressure sensor array,
comprises a housing composed to comprise a first plate with an outer surface facing in a first direction, and a second plate with an outer surface facing in a second direction opposite to the first direction;
a display exposed through the outer surface of the first plate;
a pressure sensor array arranged inside the housing and arranged below the display;
a processor located inside the housing and electrically connected to the display and the pressure sensor; and
a memory electrically connected to the processor and located inside the housing,
wherein the pressure sensor array, comprises the pressure sensor array of claim 1.

14. An electronic device,
comprises a display;
a pressure sensor array which detects pressure applied to a first region and the pressure applied to a second region of the display with spatial resolution different each other;
a memory; and
a processor electrically connected to the memory,
wherein the pressure sensor array, comprises the pressure sensor array of claim 1.

15. The electronic device according to claim 12,
wherein in the electronic device comprising a stretchable pressure sensor array, the spatial resolution of a pressure sensor is tens of dpi to hundreds of dpi.

* * * * *